Figure 1:
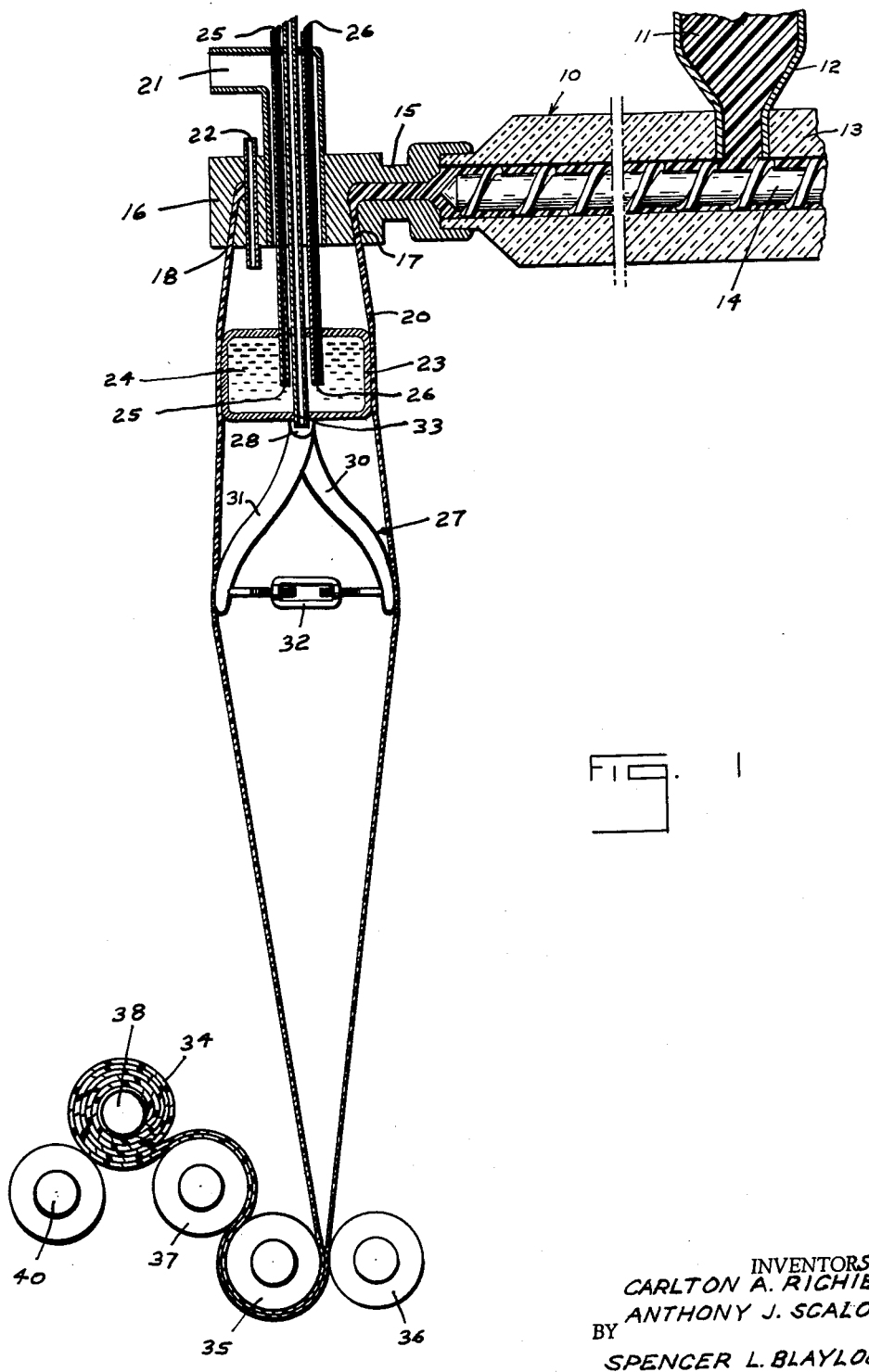

Aug. 4, 1964

C. A. RICHIE ETAL 3,142,865

METHOD AND APPARATUS FOR PRODUCING
THERMOPLASTIC TUBING AND SHEETING

Filed Oct. 26, 1961

2 Sheets-Sheet 1

INVENTORS
CARLTON A. RICHIE &
ANTHONY J. SCALORA
BY
SPENCER L. BLAYLOCK, JR.
& W. A. SCHAICH
ATTORNEYS

Aug. 4, 1964
C. A. RICHIE ETAL
METHOD AND APPARATUS FOR PRODUCING
THERMOPLASTIC TUBING AND SHEETING
3,142,865
Filed Oct. 26, 1961
2 Sheets-Sheet 2
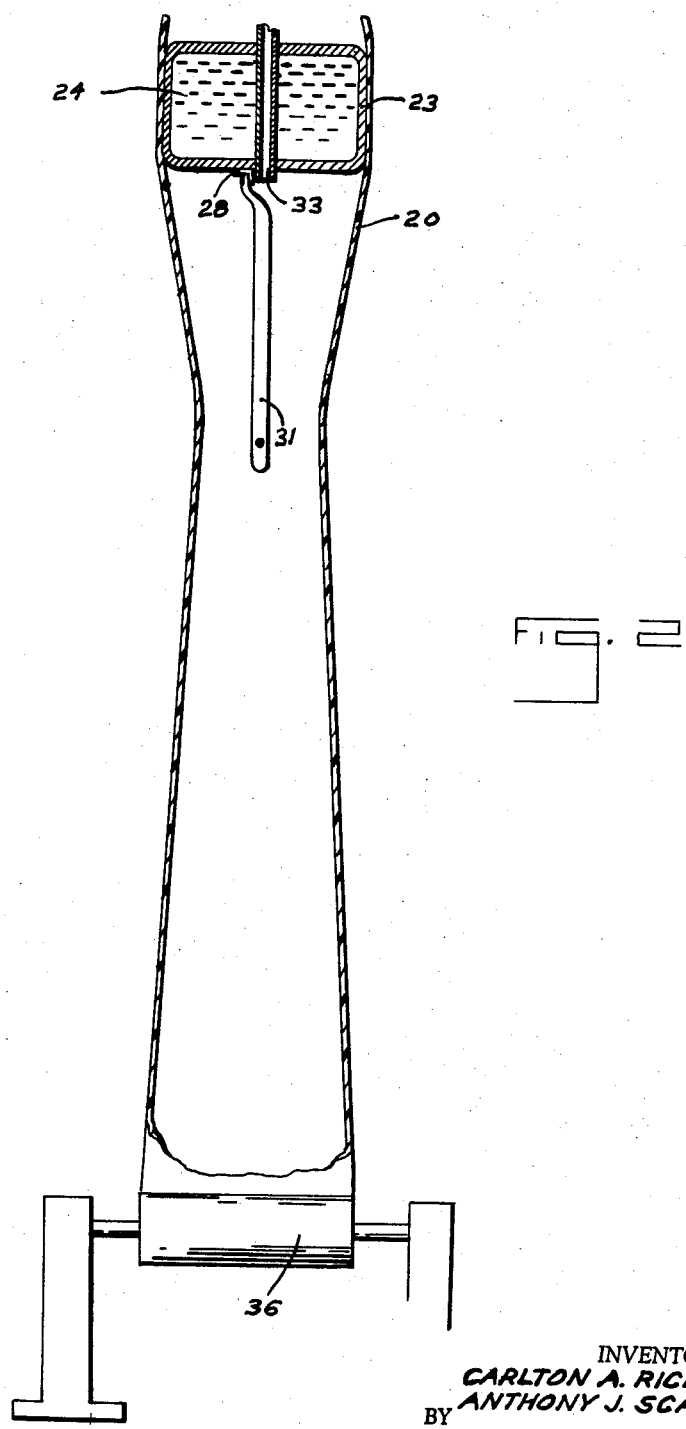
INVENTORS
CARLTON A. RICHIE &
BY ANTHONY J. SCALORA
SPENCER L. BLAYLOCK, JR
& W. A. SCHAICH
ATTORNEYS

United States Patent Office 3,142,865
Patented Aug. 4, 1964

3,142,865
METHOD AND APPARATUS FOR PRODUCING THERMOPLASTIC TUBING AND SHEETING
Carlton A. Richie and Anthony J. Scalora, both of Toledo, Ohio, assignors to Owens-Illinois Glass Company, a corporation of Ohio
Filed Oct. 26, 1961, Ser. No. 147,867
9 Claims. (Cl. 18—14)

This invention relates to a method and apparatus for the production of thermoplastic tubing and sheeting and, more particularly, to a method and apparatus for producing thin-walled, continuous, seamless tubing and sheeting.

There are several methods suggested in the prior art for manufacturing thermoplastic tubing and sheeting. One such method is described in U.S. Patent 2,720,680, dated October 18, 1955, and issued to Milo R. Gerow. The method described in this patent comprises extruding in non-self-sustaining condition heated synthetic thermoplastic tubing of a size smaller than that finally desired. The extruded tube is then passed over a cooling former or mandrel of the size and contour desired in the final tubing. A low pressure gaseous medium is maintained in the tubing between the points of extrusion and cooling. The pressure of this medium is such that it prevents collapse only of the tubing and maintains a predetermined or desired bubble profile in the area between die face and cooling mandrel.

As the tubing is passed over the cooling former it is stretched to the desired size and cooled to a set condition. Thereafter the tubing is passed over a device known as a spreader which changes the cross-sectional shape of the tubing from circular to elliptical. This facilitates collapse of the tubing and enables the tubing to be passed between a pair of nip rolls and thence to a collecting device.

It was found that tubing manufactured by the above described and other similar processes did not possess an even caliper. The tubing had thick and thin portions with the result that bags and other articles formed from the tubing were of a poor quality.

It is therefore an object of the present invention to provide a method and apparatus for producing thermoplastic tubing having a substantially uniform caliper.

It is another object of this invention to provide a method and apparatus for producing thin-walled seamless thermoplastic tubing of a substantially even caliper.

A further object of this invention is to provide a new and improved method and apparatus for extruding seamless thermoplastic tubing and sheeting over a cooling mandrel which tubing and sheeting is of a substantially uniform caliper irrespective of the thickness of the tubing.

These and other objects and advantages of this invention will become apparent from a reading of the following detailed description of our invention taken in conjunction with the drawings in which:

FIGURE 1 is an elevational view in cross-section of one form of the apparatus capable of producing the desired thermoplastic tubing, and FIGURE 2 is a side view in cross-section of the apparatus of FIGURE 1.

In accordance with the present invention, thermoplastic material such as polyethylene in a state of plasticity suitable for subsequent forming is extruded in the form of seamless tubing from a die. The tubing is, at this point, in a substantially non-self-sustaining condition, that is, it is in such a condition that it may be subsequently stretched. The tubing while in this formative state is drawn over a cooling former or mandrel to stretch or expand the tubing to its final desired size and to set the same, when it has reached its final desired size.

The drawing of the tubing from the die and over the former is carried out by a pair of nip or pull rolls which also collapses the tubing to give lay flat tubing. Prior to passing through the nip or pull rolls the tubing is passed over a spreader or other similar device which changes the cross-sectional shape of the tubing from circular to elliptical. The nip rolls are driven at a speed to maintain the tubing under suitable tension in order that proper orientation of the tubing will be obtained. The degree of orientation of the tubing will depend upon the speed at which the nip rolls are driven.

Inasmuch as the thermoplastic material is in a formative and substantially non-self-sustaining condition as it is extruded, air or other suitable gaseous medium is introduced into the tubing between the points of extrusion and cooling. The air or other gaseous medium is maintained within the tubing at a pressure sufficient to prevent collapse of the tubing. Since certain volatile substances may be within the tubing suitable venting is provided thereby permitting circulation of the gaseous medium.

The amount of gaseous medium may be varied within rather wide limits. That is, it may be sufficient to prevent collapse only of the tubing or it may even be such that partial expansion of the tubing may be obtained.

The tubing, as it passes over the cooling former which is of the size desired as the final size of the tubing, is cooled, stretched and then substantially set to its final size or diameter. If complete setting is not obtained as the tubing passes over the former it will occur as the tubing passes through the air to the nip rolls.

The distance of the former or mandrel from the die may vary. It should be sufficiently close to the die so that the tubing is still in its formative state as it passes over the same. Thus the temperature of the thermoplastic material as it is extruded will constitute one of the variables which will influence the position of the former. Also the increase in diameter of the tubing from the die to the former is another contributing factor. The temperature of the former and its position are variables which are readily determined by those skilled in the art and require no further description.

The tubing after it is drawn over the former is passed over a spreader which changes the cross-sectional shape of the tubing from circular to elliptical. Thereafter the tubing is collapsed to a flattened form by passing the same through the pair of nip rolls which have drawn the tubing from the extrusion die. The longitudinal axes of the rollers is normal to the major axis of the tubing when it is elliptical in cross-section.

Air or other gaseous medium under pressure is introduced into and maintained within the tubing at the points between the former and the nip rolls. The gaseous medium need not be at any specific pressure, however, it is preferred that the pressure be slightly in excess of atmospheric pressure.

After the tubing has been collapsed by passing the same through the nip rolls, it is taken up by a collection device such as a windup reel. If sheeting rather than tubing is the desired product a suitable slitting device may be provided to slit the tubing at one or more points so as to provide one large sheet or two or more sheets. The sheeting may be collected on one or more windup reels as desired.

Reference will now be had to the drawings wherein by preferred example only is illustrated one embodiment of the apparatus of this invention. A conventional extruder 10 is employed to transform the thermoplastic material 11, such as polyethylene, into a molten or semi-molten mass suitable for extrusion. The thermoplastic material is fed to the extruder via hopper 12 to the interior of the barrel 13 of the extruder 10. Therein it is conveyed forward, compacted and melted by the combination of heat from the barrel 13 and the mechanical shear exerted on the material by the screw 14.

The molten plastic material 11 in a condition of plasticity suitable for subsequent forming operations is forced from the extruder 10 through a passageway 15 at the exit end of the extruder. Thereafter it is passed through a radial passageway 17 in a die head 16 and out of an orifice 18 in the form of tubing 20 which is in a substantially non-self-sustaining condition.

The die head 16 is provided with a plurality of passageways or conduits which will be explained hereinafter. One such passageway is air conduit 21 which is connected to an air supply (not shown) and extends through the die head 16 in order that air or other gaseous mediums may be introduced into the tubing 20. If desired, valve means may be provided in air conduit 21 to control the volume and pressure of the gaseous medium in the tubing 20. The air or gaseous medium introduced from air conduit 21 may be passed out of the tubing 20 through vent 22 which extends through the die head 16.

The thermoplastic tubing 20 is drawn from the orifice 18 through free space downwardly and passes over the exterior surface of the cooling former or mandrel 23. The former 23 is provided with a circulating cooling medium 24 in order that the former 23 will cool and set the tubing 20 as it passes over its exterior. An inlet pipe 25 and an outlet pipe 26 which extend from a source of cooling medium (not shown) through the die head 16 to the interior of the former 23, are utilized to provide circulation of the cooling medium 24 through the former 23. In addition the pipes 25 and 26 may be used to position the former 23 at the desired distance from the orifice 18.

The diameter of the former 23 will vary with the desired diameter of the tubing 20. The tubing 20 as it exits from the orifice 18 has a diameter less than that finally desired. The former being of a larger and the desired diameter will expand and stretch the tubing 20 as it passes over the exterior of the former.

Preferably the tubing 20 is drawn vertically downwardly over the former 23. Thereafter it is passed over a spreader 27 which flattens the tube substantially and changes its cross-sectional shape from circular to elliptical. The spreader 27 is secured at its upper end to the underside of the former 23 and held then by a pivot 28. The spreader arms 30 and 31 are arcuate in shape and extend outwardly and downwardly from the pivot 28. The relative position of the spreader arms 30 and 31 with respect to each other are adjustable by manipulation of toggle 32. Thus it is possible to substantially flatten the tubing 20 by extending the spreader arms 30 and 31 or to merely change slightly the cross-sectional shape thereof by positioning the arms closer together.

As the tubing 20 is withdrawn from the former and passed over the spreader 27, air is introduced into the tubing. The air is supplied to the interior of the tubing below the former 23 by a conduit 33 which extends from, preferably, a second air source (not shown) through the die head 16 and former 23 to open communication with the interior of the tubing 20 below the former. The volume and pressure of the air or other gaseous medium may be controlled by suitable value arrangement (not shown). The pressure should be sufficient to prevent complete flattening of the tube 20 as it passes over the spreader 27.

After the tubing has passed over the spreader, it is collapsed to a flattened sheet or tube 34 by means of a pair of nip rolls 35 and 36. As the flattened tubing 34 passes between the nip rolls 35 and 36, all of the air is eliminated from the collapsed portion of the tubing. The flattened tubing 34 is maintained in surface contact with nip roll 35 and a pull roll 37. Thereafter the flattened tubing which has substantially all of the air therein evacuated is delivered to rewind or take up rolls 38 and 40. By maintaining surface contact with the rolls, the flattened tubing 34 is maintained in a substantially unrelaxed and unwrinkled condition.

The longitudinal axes of nip rolls 35 and 36, pull roll 37 and windup rolls 38 and 40 are all parallel to facilitate collection of the flattened tubing 34. The tubing 20 when it contacts the spreader 27 and is changed from a circular to an elliptical cross-section has its major axis normal to the axes of the rolls. In other words, the spreader arms 30 and 31 extend in a plane normal to the axes of the rolls.

The tubing or sheeting obtained from the above-described process and apparatus is substantially uniform in caliper. For instance a variation of about one-half mil was found in tubing so manufactured whereas tubing manufactured according to the conventional process was found to vary as much as 1.5 mils. This is significant when thin-walled tubing of about 7 mils is desired which tubing or sheeting is commercially produced in several million pound quantities.

It will be apparent from the foregoing that various modifications can be made within the spirit and scope of the following claims.

We claim:

1. A method for producing thermoplastic tubing and sheeting comprising the steps of extruding heated thermoplastic material in the form of circular tubing, passing the extruded tubing over a cooling former of the size and the contour desired in the final tubing, maintaining a low pressure gaseous medium in the tubing between the points of extrusion and cooling, cooling said tubing as it passes over said former, maintaining a low pressure gaseous medium in said tubing between said former and the point of collapsing of said tubing, changing the cross-sectional shape of said tubing from circular to elliptical, collapsing said tubing in order that the longitudinal axis of said tubing is normal to the major axis of said tubing when in elliptical form and thereafter collecting said tubing.

2. A method for producing thermoplastic tubing and sheeting comprising the steps of extruding heated thermoplastic material in the form of circular tubing, passing the extruded tubing over a cooling former of the size and contour desired in the final tubing, maintaining a low pressure gaseous medium in the tubing between the points of extrusion and cooling, cooling said tubing as it passes over said former, maintaining a low pressure gaseous medium in said tubing between said former and the point of collection of said tubing, passing said tubing over a spreader to change the cross-section of said tubing from a circular form to an elliptical form, passing said tubing through a pair of nip rolls to collapse the same, the longitudinal axes of which are normal to the major axis of said tubing when in elliptical form, and thereafter collecting said tubing.

3. A method according to claim 2 in which a constant flow of said low pressure gaseous medium is maintained into and out of said tubing between the points of extrusion and cooling and said gaseous medium being at a pressure to prevent collapse only of said tubing.

4. A method according to claim 2 wherein said thermoplastic material is polyethylene.

5. An apparatus for producing thermoplastic tubing and sheeting comprising an extruder, a cooling former to form the extruded tubing to the size and contour desired in the final tubing, said former being supported within said tubing, means for introducing a low pressure gaseous medium into said tubing between said extruder and said former, means for altering the cross-sectional shape of said tubing from circular to elliptical, means for collapsing said tubing in order that the longitudinal axis of said collapsed tubing is normal to the major axis of said tubing when in elliptical form, means for introducing a low pressure gaseous medium into said tubing between said former and said collapsing means, and means for collecting said collapsed tubing.

6. An apparatus for producing thermoplastic tubing and sheeting comprising an extruder and die head for extruding thermoplastic material in the form of tubing, said die head having an orifice of a size smaller than that finally desired, a cooling former to form the extruded tubing to the size and contour desired in the final tubing, said former being supported within said tubing, a conduit in said die head in open communication with the interior of said tubing to introduce a low pressure gaseous medium into said tubing between said die head and former, means for altering the cross-sectional shape of said tubing from circular to elliptical, means for collapsing said tubing in order that the longitudinal axis of said collapsed tubing is normal to the major axis of said tubing when in elliptical form, means for introducing a low pressure gaseous medium into said tubing between said former and said collapsing means, and means for collecting said collapsed tubing.

7. An apparatus according to claim 6 wherein said shape altering means is a spreader having arcuate arms extending outwardly and downwardly from the point by which said arms are joined to each other.

8. An apparatus according to claim 6 wherein said collapsing means comprises a pair of nip rolls.

9. An apparatus according to claim 6 wherein said means for introducing a low pressure gaseous medium into said tubing between said former and said collapsing means comprises a conduit extending through said die head and former into open communication with the interior of said tubing.

References Cited in the file of this patent

UNITED STATES PATENTS

| | | |
|---|---|---|
| 2,668,324 | Johnson | Feb. 9, 1954 |
| 2,720,680 | Gerow | Oct. 18, 1955 |
| 2,770,007 | Longstreth et al. | Nov. 13, 1956 |
| 2,987,767 | Berry et al. | June 13, 1961 |
| 2,987,776 | Miller et al. | June 13, 1961 |

FOREIGN PATENTS

| | | |
|---|---|---|
| 1,056,817 | Germany | May 6, 1959 |